United States Patent
Lubbers et al.

(10) Patent No.: US 9,164,686 B2
(45) Date of Patent: Oct. 20, 2015

(54) VIRTUAL STORAGE SPACE WITH CYCLICAL WRAPPING GRID FUNCTION

(75) Inventors: Clark Edward Lubbers, Colorado Springs, CO (US); Stephen J. Sicola, Monument, CO (US)

(73) Assignee: Seagate Technology, LLC, Cupertino, CA (US)

( * ) Notice: Subject to any disclaimer, the term of this patent is extended or adjusted under 35 U.S.C. 154(b) by 2272 days.

(21) Appl. No.: 11/771,492

(22) Filed: Jun. 29, 2007

(65) Prior Publication Data

US 2009/0006802 A1   Jan. 1, 2009

(51) Int. Cl.
G06F 3/06 (2006.01)

(52) U.S. Cl.
CPC ............ *G06F 3/0629* (2013.01); *G06F 3/0607* (2013.01); *G06F 3/0683* (2013.01)

(58) Field of Classification Search
CPC .... G06F 3/0629; G06F 3/0607; G06F 3/0683
USPC .......................................................... 711/170
See application file for complete search history.

(56) References Cited

U.S. PATENT DOCUMENTS

| | | | |
|---|---|---|---|
| 5,802,598 A | 9/1998 | Watt | |
| 6,587,921 B2 * | 7/2003 | Chiu et al. | 711/119 |
| 6,718,436 B2 * | 4/2004 | Kim et al. | 711/114 |
| 7,007,042 B2 * | 2/2006 | Lubbers et al. | 707/202 |
| 7,103,716 B1 | 9/2006 | Nanda | |
| 7,111,147 B1 * | 9/2006 | Strange et al. | 711/209 |
| 7,133,965 B2 * | 11/2006 | Chien | 711/114 |
| 7,237,062 B2 * | 6/2007 | Lubbers et al. | 711/114 |
| 2006/0218544 A1 * | 9/2006 | Chakraborty et al. | 717/168 |

* cited by examiner

*Primary Examiner* — Kalpit Parikh
(74) *Attorney, Agent, or Firm* — Hall Estill Attorneys at Law

(57) ABSTRACT

Apparatus and method for arranging a virtual storage space with a cyclical wrapping grid function. The virtual storage space is formed from a physical memory and comprises a plurality of larger grains of selected storage capacity, each divided into a power of two number of smaller grains. Each of the larger grains are distributed across a non-power of two number of storage elements so that each of the storage elements receives the same number of smaller grains.

20 Claims, 4 Drawing Sheets

LUN →

| | G0 | G1 | G2 | G3 | ... |
|---|---|---|---|---|---|
| | g0-0 | g1-0 | g2-0 | g3-0 | |
| | g0-1 | g1-1 | g2-1 | g3-1 | |
| | g0-2 | g1-2 | g2-2 | g3-2 | |
| | g0-3 | g1-3 | g2-3 | g3-3 | |
| | g0-4 | g1-4 | g2-4 | g3-4 | |
| | g0-5 | g1-5 | g2-5 | g3-5 | |
| | g0-6 | g1-6 | g2-6 | g3-6 | |
| | g0-7 | g1-7 | g2-7 | g3-7 | |

FIG. 6

TOP LEVEL MAP (TLM) ENTRY FORMAT

| 0x000FFFFF | BLM INDEX |
|---|---|
| 0x01F00000 | WRAPPING GRID OFFSET |
| 0x7E000000 | WRAPPING GRID INDEX |
| 0x80000000 | SPARSE ALLOCATIONS FLAG |

FIG. 7

WRAPPING GRID (FOR SE=9)

VIRTUAL STORAGE SPACE WITH CYCLICAL WRAPPING GRID FUNCTION

BACKGROUND

Data storage devices are used in a variety of applications to store and retrieve user data. The data are often stored to internal storage media, such as one or more rotatable discs accessed by an array of data transducers that are moved to different radii of the media to carry out I/O operations with tracks defined thereon.

Storage devices can be grouped into storage arrays to provide consolidated physical memory storage spaces to support redundancy, scalability and enhanced data throughput rates. Such arrays are often accessed by controllers, which in turn can communicate with host devices over a fabric such as a local area network (LAN), the Internet, etc. A virtual storage space can be formed from a number of devices and controllers to present a single virtual logical unit number (LUN) to the network.

SUMMARY

Various embodiments of the present invention are generally directed to an apparatus and method for arranging a virtual storage space with a cyclical wrapping grid function.

In accordance with various embodiments, the virtual storage space is formed from a physical memory and comprises a plurality of larger grains of selected storage capacity, each divided into a power of two number of smaller grains. Each of the larger grains are distributed across a non-power of two number of storage elements so that each of the storage elements receives the same number of smaller grains.

BRIEF DESCRIPTION OF THE DRAWINGS

FIG. 6 sets forth a generalized depiction of a top level grouping of large grains and smaller grains of memory capacity that make up the virtual LUN of FIGS. 3-5.

FIG. 7 generally illustrates relevant components of an entry format for a top level map (TLM) used in conjunction with FIG. 6.

FIG. 8 sets forth an exemplary cyclical wrapping grid function sequence.

DETAILED DESCRIPTION

Figure 1:
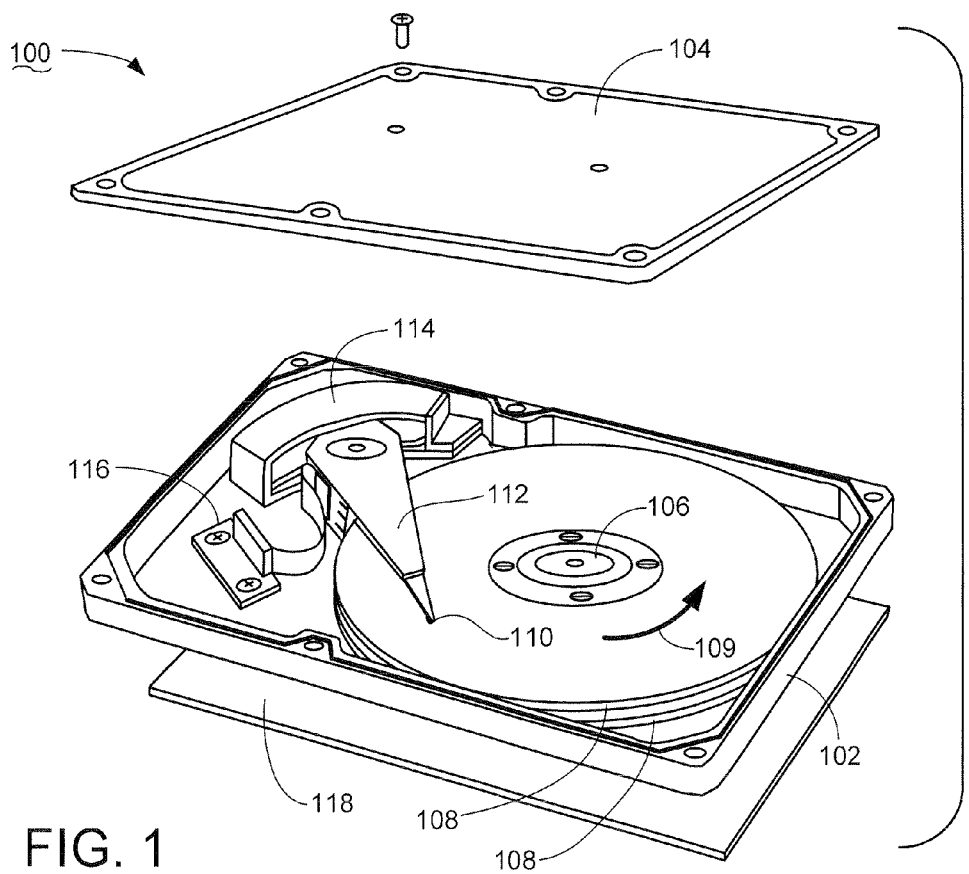
FIG. 1 shows an exemplary data storage device.

FIG. 1 shows an exemplary data storage device in accordance with various embodiments. The device is characterized as a hard disc drive of the type configured to store and transfer user data with a host device, although such is not limiting.

The device 100 includes a housing formed from a base deck 102 and top cover 104. A spindle motor 106 is configured to rotate a number of storage media 108 in rotational direction 109. The media 108 are accessed by a corresponding array of data transducers (heads) 110 disposed adjacent the media to form a head-disc interface (HDI).

A head-stack assembly ("HSA" or "actuator") is shown at 112. The actuator 112 rotates through application of current to a voice coil motor (VCM) 114. The VCM 114 aligns the transducers 110 with tracks (not shown) defined on the media surfaces to store data thereto or retrieve data therefrom. A flex circuit assembly 116 provides electrical communication paths between the actuator 112 and device control electronics on an externally disposed printed circuit board (PCB) 118.

Figure 2:
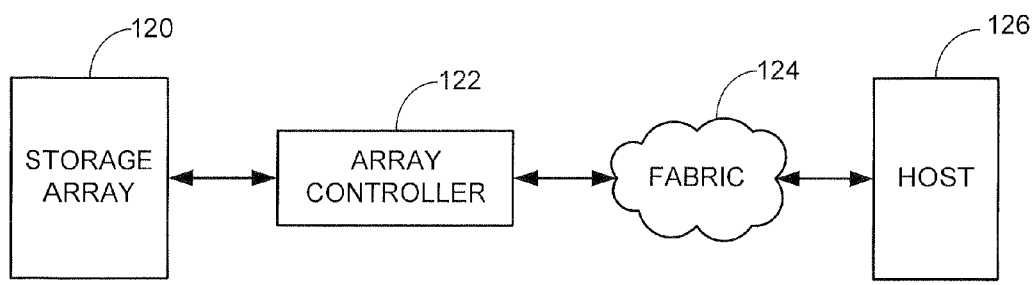
FIG. 2 sets forth a network system that incorporates the device of FIG. 1.

In some embodiments, the device 100 is incorporated into a multi-device data storage array 120, as shown in FIG. 2. The storage array 120 is made up of a plurality of such devices arranged into a larger memory space, such as in a selected RAID (redundant array of independent disks) configuration.

The storage array 120 is controlled by an array controller 122, which is provisioned with one or more processing cores to manage complex data I/O transactions with the array. While only a single array 120 and a single controller 122 are shown in FIG. 2, in a preferred embodiment redundant arrays and controllers arranged in parallel to enhance system reliability and availability.

The controller 122 communicates across a computer network, or fabric 124 to any number of host devices, such as exemplary host device 126. The fabric can take any suitable form, including the Internet, a local area network (LAN), etc. The host device 126 can be an individual personal computer (PC), a remote file server, etc.

Figure 3:
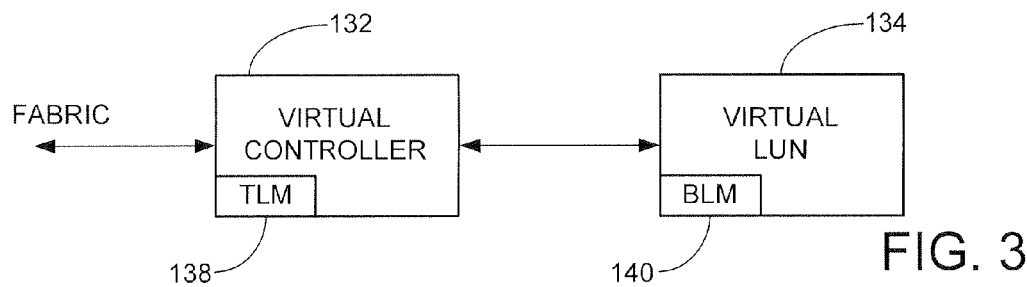
FIG. 3 generally illustrates a virtual logical unit number (LUN) storage space in conjunction with a virtual controller in accordance with various embodiments of the present invention.

FIG. 3 generally illustrates a virtual logical unit number (LUN) storage space 130 in conjunction with a virtual controller 132 in accordance with various embodiments of the present invention. Generally, the storage capacity of the LUN is virtualized across a number of network elements in order to scale system performance above the capabilities of a single controller while mitigating the effects of failures on individual controllers. This allows the LUN of FIG. 3 to be accessed transparently for any particular controller 122 (FIG. 2), while providing enhanced performance levels for loads dominated by random access patterns.

Figure 4:
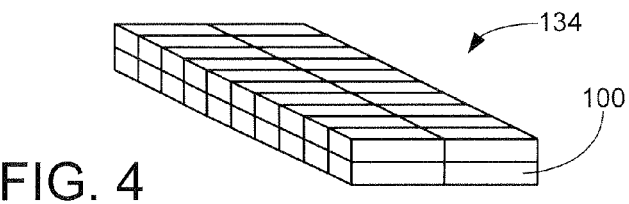
FIG. 4 is a schematic depiction of a storage element (SE) formed from a selected number of storage devices as in FIG. 1, such as 40 devices.

The physical memory of the virtual LUN 130 is preferably formed from a number of storage elements (SE), such as generally depicted at 134 in FIG. 4. The exemplary SE 134 in FIG. 4 is contemplated as comprising a number of about 40 data storage devices 100 (FIG. 1). In accordance with current generation technology levels, each individual device 100 can process on the order of about 250 IOPS (input/output operations per second) for random loads, and the overall SE 134 is provisioned with four 4 GB/s ($4 \times 10^9$ bytes/sec) I/O ports and a total of about 50 TB ($50 \times 10^{12}$ bytes) virtual capacity.

Figure 5:
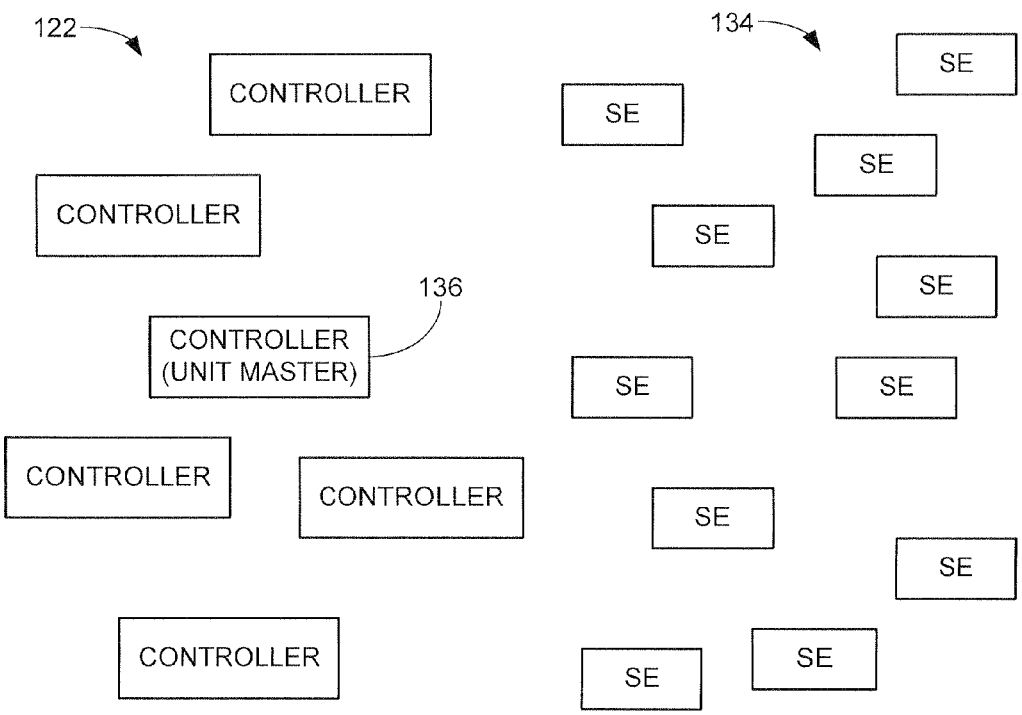
FIG. 5 generally depicts a physical memory space with a plurality of physical controllers and physical storage elements that can be selectively incorporated into the virtual elements of FIG. 3.

As further shown in FIG. 5, any number of SEs 134 (and/or portions thereof), and associated controllers 122, can be grouped together to form and maintain the virtual LUN structure of FIG. 3. Preferably, one of the controllers is denoted as the "unit master" (reference numeral 136) to provide a single locus of control for the virtual LUN, although host queries can be initially directed to any of the controllers 122 of the virtual LUN. Additional SEs 134 and/or controllers 122 can be switched in or out of the LUN as desired to meet existing operational requirements.

As desired, a particular host device (such as 126, FIG. 2) may be configured to recognize the LUN as presented by all of the controllers as being the same LUN even though the world wide name (WWN) of each individual controller is different. Alternatively, a group of array controllers 122 will be bound together to present a common WWN node name and different port names for each associated port. This latter configuration allows the combined I/O capabilities of all of the respective devices 100 (FIG. 1) associated with the controllers 122 to support the capability of the LUN itself.

A "basic mode" of operation for the LUN is thus defined as an operation in which the controllers 122 are bound to provide a virtual single array controller with many ports that present a single WWN node name. The basic mode passes all commands through the unit master 136 designated for a particular LUN in order to present a standard SCSI model transparently to each host; that is, all commands issued by hosts are passed through the unit master. Commands can be issued to any of the controllers 122, but the receiving controller gets permission from the unit master 136 before proceeding with the command.

In an "enhanced mode" of operation, a split SCSI model is preferably enacted in cooperation with all hosts to provide cached data and command gate keeping functions through the unit master 136. The enhanced mode involves all hosts knowing that a split LUN with a unit master arrangement is being used, and coordination of commands is carried out via appropriate rules at the host level to ensure proper behavior (i.e., no conflicts). Enhanced mode operation significantly improves performance by allowing most requests to be processed by controllers 122 other than the unit master 136 without requiring the controllers 122 to check with the unit master 136, as in the basic mode.

A novel mapping scheme is utilized by the system of FIG. 3, which facilitates system expansion and data migration. This mapping scheme preferably uses a number of data structures, including a top level map (TLM) 138 and a bottom level map (BLM) 140. The TLM 138 can be maintained at the host 126 and/or controller 122 level, whereas the BLM 140 is preferably maintained at the SE 134 level.

The virtual storage space of the LUN is arranged as a plurality of larger grains of selected storage capacity, such as in the range of about 2 GB to 4 GB. Each of the larger grains can be moved independently within the LUN 130, which facilitates parallel migration of multiple larger grains as desired. Each of the larger grains is divided into a number of smaller grains, such as on the order of 8 MB ($8 \times 10^6$ bytes) or 16 MB. The number of smaller grains in each of the larger grains is preferably selected to be a power of 2 (e.g., 8, 16, 32, etc.). The TLM 138 generally describes the locations of the smaller grains as the larger grains are distributed (striped) across multiple SEs 134, with a different SE 134 storing a different smaller grain.

Figures 6, 7, 8:
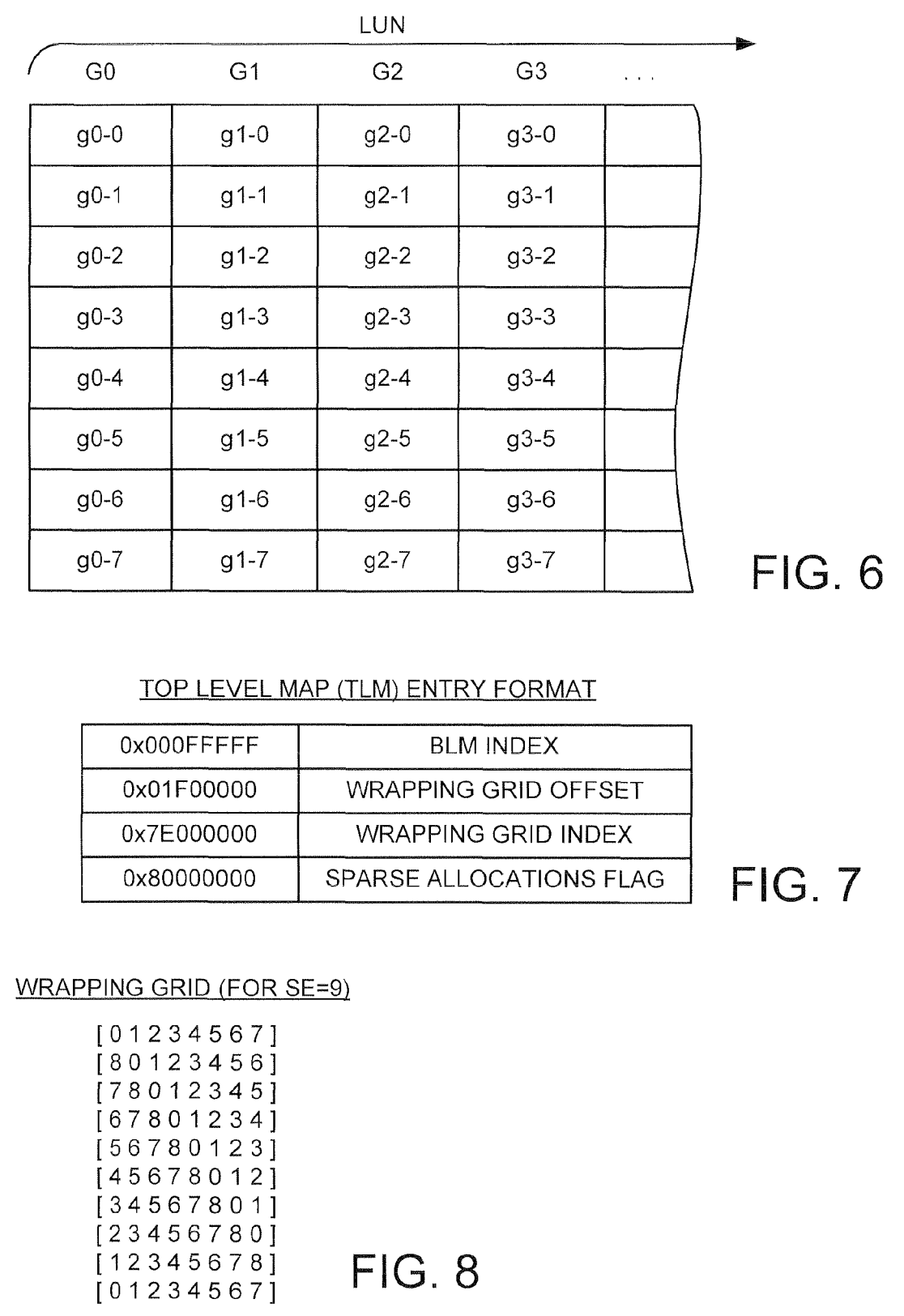

By way of illustration, FIG. 6 generally shows a number of larger grains that form a part of the LUN virtual space. The larger grains are denoted in FIG. 6 as G0-G3. Each of the larger grains is further shown to be made up of eight (8) smaller grains. The smaller grains of larger grain G0 are denoted in FIG. 6 as g0-0 through g0-7.

Each of the smaller grains in the mapping scheme is managed by a separate SE 134. Preferably, this smaller grain is in turn internally striped across multiple devices 100 (see FIG. 4) and may be mirrored or otherwise redundantly stored therein. Each SE 134 further has a map for the entire LUN by way of the TLM. As explained in greater detail below, each controller 122 will preferably have a TLM that is identical except for the BLM index values in each entry. An index into the TLM is derived from the VBA (virtual block address) by dividing by the grain size of 2 GB or 4 GB in blocks.

A Member Position value is also derived from the VBA (in a manner explained below), with the Member Position being added to a Wrapping Grid Offset value in the TLM entry to index the particular array identified by a Wrapping Grid Index. The value returned is a SET value (Storage Element Tag). If the returned SET value matches the SET value of a particular SE 134, then the VBA blocks reside on that SE 134. Otherwise, the SET value indicates which SE contains the VBA blocks. In this way, the BLM on each SE 134 only maps the smaller grains present on that particular SE.

In the aforementioned "basic mode," all commands flow through the unit master controller 136 (FIG. 5), and the data and status for each command will be delivered by the associated SE 134 via the controller 122 to which the command was directed. The unit master controller 136 preferably manages migration and updating of the maps, although migration of a specific set of grains from a given SE 134 will be performed at the SE level. Such migration generally involves moving sets of grains amounting to ⅛th of a BLM (corresponding to 1 TLM entry) on a particular storage element, one set at a time. The associated TLM entry will be updated on each SE after the completion of the data movement.

Generally, the BLM 140 is arranged to incorporate multiple virtual spaces (at the smaller grain) into an SE level data structure (such as 2 GB or 4 GB). A wrapping grid is formed from a cyclical wrapping grid function as a repeating pattern of storage element tag (SET) values. Every SE 134 is assigned a unique SET value, and the wrapping grid can support up to a total of 32 SEs 134 (e.g., SET values of 0 to 31). The SET values in each wrapping grid are preferably ordered and repeated enough times to fill a 64 byte array. For reference, a larger storage array virtualization environment (SAVE) is provided to support up to 256 SEs 134 (and hence, up to 8 wrapping grids).

A selected entry in the TLM 138 is preferably set forth in FIG. 7, and includes a BLM index value, a Wrapping Grid Offset value, a wrapping grid index, and a sparse allocations flag. In this way, the TLM 138 tracks where each of the smaller grains are located among the variously distributed SEs 134.

The format for the BLM 140 includes a stripe width shift value, which is selected in relation to a given wrapping grid. As explained below, the virtual spaces for each entry are adjacent when the stripe width shift value is zero, and non-adjacent with the stripe width shift value is non-zero. Preferably, the non-zero stripe width shift values can be 3, 4, or 5 for a given wrapping grid. A change in the available memory size (e.g., adding or removing an SE 134) may affect the striping. For example, transitioning from 15 to 16 SEs 134 in a given grid would change the striping to every 16th element rather than every 8th element; half of the data would be redistributed in such case, but this would allow performance rates to be essentially doubled.

At the appropriate boundary (e.g., power of 2) for a given stripe width, a set of TLM entries will reference the same BLM because the virtual block addresses (VBAs) in each of these TLM entries will be contained within that associated BLM. The missing VBA ranges will be striped on other SEs 134 within that grouping.

FIG. 8 sets forth an exemplary cyclical wrapping grid function for a situation where large grains are to be distributed across nine (9) different SEs 134 (SET values of 0-8). As can be seen from FIG. 8, the pattern begins with the sequence [0 1 2 3 4 5 6 7], and cycles through nine iterations to arrive back at the initial [0 1 2 3 4 5 6 7] pattern.

In this example, the largest power of 2 less than nine 9 is 8 ($2^3$), so the stripe width is 8 with a shift value of three 3. The shift value is stored in a table and will be associated with the particular 64 byte array of SET values for that wrapping grid. There are 9 Wrapping Grid Offset values that produce unique sets within the array. By using each offset aligning with the SET value of the SE 134 in turn when mapping the particular data, the data will be uniformly distributed across the 9 SEs 134.

Figure 9:
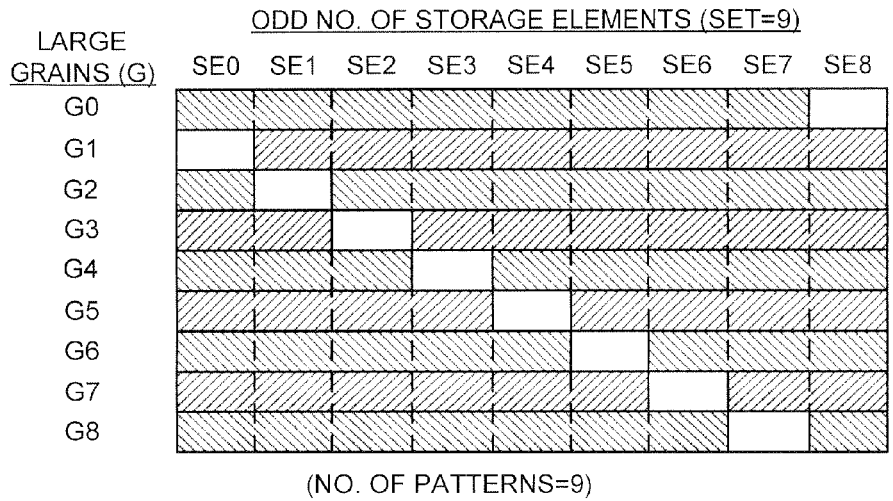
FIG. 9 exemplifies storage of large grains across a set of storage elements in accordance with the wrapping grid function of FIG. 8.

This is generally exemplified in FIG. 9, which shows 9 SEs 134 (denoted SE0-SE8) across which are striped 9 larger grains (denoted as G0-G8) in accordance with the function of FIG. 8. The respectively striped data are shown in cross-hatched fashion in FIG. 9. Note that in this example, the number of smaller grains are nominally balanced among the various SEs 134, with each SE storing a total of 8 smaller grains from the 9 larger grains.

The non-used portions of the various SEs 134 in FIG. 9, denoted by the blank squares within the grid, indicate that the particular SE 134 does not contribute to that large grain. While FIG. 9 conceptually shows a large grid, preferably each square therein represents 4 GB of space (assuming 16 MB smaller grains) with interleaving at a 16 MB grain. This distributes the grains finely in terms of map boundaries for better spread over the overall 32 GB space. That is, 32 GB is striped at a 16 MB stripe size across the same 8 elements. For the next 32 GB, a different set of 8 elements (out of the 9 elements) is used.

Nevertheless, with respect to the larger grains G0-G8 depicted in FIG. 9, the data of such grains are nominally balanced among the respective storage elements SE0-SE8; that is, each of the storage elements 134 store the same number of smaller grains, which promotes enhanced data I/O rates and reduces bottlenecks for these grains. As noted above, a total of 9 separate patterns (FIG. 8) are used to establish this balancing.

The TLM entry for a given VBA offset (e.g. a 2 GB or 4 GB boundary) will have a different Member Position on each SE 134. The Member Position value determines which set of VBA ranges are mapped to a given SE 134. In the example of FIG. 9, a TLM entry for storage element SE0 will have the following combinations of Wrapping Grid Offsets and member positions as follows: {0,0}, {8,1}, {7,2}, {6,3}, {5,4}, {4,5}, {3,6}, and {2,7}. The SET value of "0" does not occur in the position in the wrapping grid which is equivalent to the ninth pattern in FIG. 8. If the values of FIG. 8 are treated as a sequence of 9*8=72 bytes, all patterns can be obtained by referencing the first 9 positions (offsets 0-8). With a maximum Member Position of 7, the maximum index is 15 (8+7), so only the first 16 bytes need be filled in. FIG. 8 accordingly shows the set of 9 different, unique patterns.

The repeating patterns can be specified using the offset values that are always less than the number of unique members. If a 4 G BLM is used, then every eight entries in the TLM 138 starting on 32 GB boundaries (8*4 GB) will have the same Wrapping Grid Offset and BLM index values.

The starting VBA of the second 32 GB will have a value of 0x4000000. If the offset value is 8 and the Member Position is 1 (which identifies a SET value of 0), then the first VBA mapped in this range on the SE 134 with a SET value of 0 (i.e., SE0 in FIG. 9) will be offset by 1. This VBA has a VBA offset of 1*16 MB (0x8000) and a value of 0x4008000. The corresponding smaller grain will be mapped by the first entry in the BLM 140. The next entry will have a VBA value that is 8*16 MB (0x40000) higher, which is a value of 0x2048000.

In this way, each SE 134 can not only tell if it has the data for a given VBA range, but can also tell where the data are when it does not have it. In this example, each one of the SEs 134 that together map the 32 GB of virtual space has ⅛ of each 4 GB of space (one TLM entry) compacted into one 4 GB BLM.

Preferably, during operation the Member Position will be checked by inspecting the wrapping grid starting at the Wrapping Grid Offset to find the SET value that matches the SET value for the given SE 134. The host will get the SET value to use by shifting the VBA right by 15 (i.e., by dividing by 16 MB) to get the relative offset of the given smaller grain, and then masking by a value of the strip width minus 1 to get the member position. The Member Position is then added to the Wrapping Grid Offset to access the actual wrapping grid table.

The associated SE 134 likewise calculates the Member Position value for a given VBA it is requested to access and checks the wrapping grid to see if it has the associated data. It is contemplated that a host will be configured to be able to accommodate 16 MB boundary crossings. In the aforementioned "basic mode," if a first receiving SE 134 does not have the requested data, the first receiving SE 134 will access a second SE 134 which has the data, obtaining permission as required from the unit master controller 136 (FIG. 5) as required.

Preferably, the way in which data are distributed across various SEs 134 depends on a number of factors, such as the number of SEs 134 in the associated wrapping grid. When the number of SEs is odd, the number of unique patterns will preferably equal the number of SEs (e.g., the wrapping grid of FIGS. 8-9 uses both 9 patterns and 9 SEs 134, etc.), although such is not necessarily required.

Figure 10:
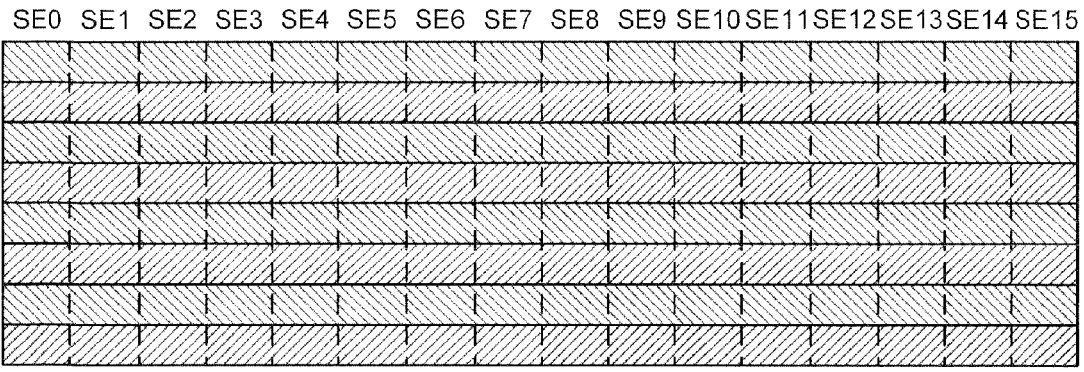
FIG. 10 exemplifies another wrapping grid function.

When the number of SEs in a wrapping grid is even, the number of patterns required to balance the small grains can depend on whether the number of SEs is a power of 2; if so, only one pattern is preferably used. More particularly, when the total number of SEs is equal to 1 ($2^0$), 2 ($2^1$), 4 ($2^2$), 8 ($2^3$), or 16 ($2^4$), then a single pattern is used, since each large grain can be equally distributed across all members of the wrapping grid. This is exemplified in FIG. 10, which shows a total number of SEs 134 equal to 16, each large grain is divided up into 16 smaller grains, and each of the SEs 134 receives one of the smaller grains from each of the larger grains.

Figure 11:
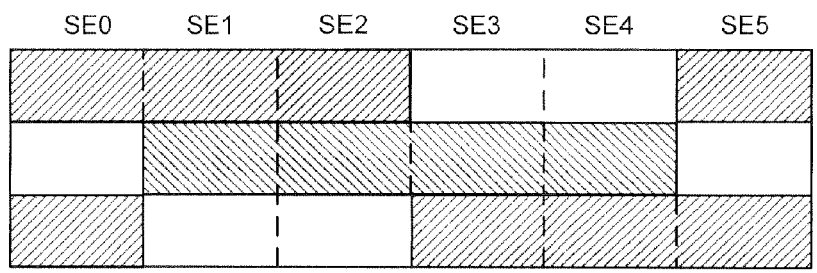
FIG. 11 exemplifies yet another wrapping grid function.

On the other hand, when the number of SEs is even and not a power of two, then the total number of wrapping grid patterns is preferably determined by dividing the number of SEs by the largest power of 2 that can be accommodated. This provides the following number of SEs/number of pattern combinations: {6,3}, {10,5}, {14,7}, {18,9}, {20,5}, {22, 11}, {24,3}, {28,7} and {30,15}. As illustrated in FIG. 11, a total number of 6 SEs 134 (SE0-SE5) use 3 different patterns to receive 4 smaller grains from a larger grain. It will be noted that each of the SEs 134 in FIG. 11 store the same number of smaller grains (i.e., 2). Similarly, from the foregoing sequence it can be seen that if 30 SEs 134 are used, then it is necessary to cycle through 15 different patterns to evenly distribute the data. Generally, it may be better to use all patterns to minimize the redistribution cost when adding or removing SEs 134 from a given set.

The foregoing mapping scheme advantageously allows a host to know (via SET value) where data are on a given small grain boundary, such as 16 MB, using 16 bits per 4 GB. Aside from the wrapping grid definitions and a table to map SET values to ports, the only other values required by the host are the Wrapping Grid Offset and Wrapping Grid Index.

Thus, a selected host can efficiently map a large amount of virtual memory using a relatively small amount of overhead data; for example, 2 TB of virtual space can be mapped using only 1 KB ($1 \times 10^3$ bytes) of memory. It will be appreciated that the host need not manage or store the maps at all; rather, these can be maintained by the SEs 134 and/or the SEs and the controllers 122. In enhanced mode, the host will be notified in real time when it issues a particular I/O request to the wrong SE 134 because the data have been moved. In basic mode, the host need never know.

To provide a concrete illustration of a system configured as set forth above, if the SE configuration is assumed to have 4 400 MB/s host ports, 40 drives, and 50 TB of virtual capacity, then a SAVE with 256 SEs 134 can create a single virtual LUN 130 (FIG. 3) that is 12.8 PB ($12.8 \times 10^{12}$ bytes) in size. Assuming a stripe width of 32, a bandwidth into a single host (with 128 host adapters) can be sustained at a rate of 51.2 GB/s for a given wrapping grid.

Further, if the host can issue sufficient requests and has 1024 host adapters, then a single SAVE under these conditions can generally sustain a bandwidth of around 409.6 GB/s. Assuming 250 IOPS per drive, then a wrapping grid with 32 SEs 134 can support a level of around 320 K IOPS ($320 \times 10^3$ IOPS). A SAVE with 256 SEs 134 can further support 2.56 M IOPS ($2.56 \times 10^6$ IOPS), and a host would require a mere 6.4 MB to map the entire 12.8 PB virtual LUN.

The foregoing embodiments have preferably utilized the virtual controller and virtual LUN model of FIG. 3, in which host commands flow through one or more controllers 122 (including the unit master 136 when in basic mode) to the SEs 134 and vice versa. In other preferred embodiments, the controllers 122 are unnecessary and are not used; instead, the storage elements are characterized as intelligent storage units with one or more intelligent storage processors (ISPs) and the hosts address the ISEs directly.

In this alternative scheme, the hosts operate in enhanced mode to address commands directly to the storage element that maps the particular grain in question. As desired, a particular one of the storage elements could be selected to operate as the "unit master," to coordinate requests in the basic mode; as before, all of the SEs would have the TLMs and would coordinate received requests through the unit master SE before proceeding.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising mapping a physical memory to a virtual storage space comprising a plurality of larger grains of virtual storage capacity, an entirety of each larger grain divided into a power of two number of smaller grains that is greater than two smaller grains, and distributing each of the larger grains to form an entire stripe across a non-power of two number of storage elements collectively defining the physical memory so that each of the storage elements receives the same number of the smaller grains.

2. The method of claim 1, wherein each of the storage elements is provided with a corresponding storage element tag (SET) value, and wherein the distributing step is carried out in accordance with a cyclical wrapping grid function that incrementally cycles through different patterns of the SET values.

3. The method of claim 2, wherein the non-power of two number is odd, and a total number of the different patterns is equal to the non-power of two number.

4. The method of claim 2, wherein the non-power of two number is even, and wherein a total number of the different patterns is equal to the non-power of two number divided by a power of two.

5. The method of claim 1, wherein the distributing step comprises forming a top level map (TLM) with a wrapping grid offset value indicative of a selected storage element address.

6. The method of claim 5, further comprising a step of identifying a selected storage element to which a selected set of small grains is stored in relation to the wrapping grid offset value.

7. The method of claim 5, wherein the distributing step further comprises forming a bottom level map (BLM) separately stored on each of the storage elements that identifies where each of the smaller grains of all of the storage elements are stored.

8. The method of claim 1, wherein each of the plurality of large grains is on the order of about 2 GB to 4 GB in size.

9. The method of claim 1, wherein the non-power of two number is less than 32.

10. An apparatus comprising a physical memory mapped to a virtual storage space comprising a plurality of larger grains of virtual storage capacity, an entirety of each larger grain divided into a power of two number of smaller grains that is greater than two smaller grains, each of the larger grains distributed to form an entire stripe across a non-power of two number of storage elements collectively defining the physical memory so that each of the storage elements receives the same number of the smaller grains.

11. The apparatus of claim 10, wherein each of the storage elements comprises a plurality of arrayed data storage devices.

12. The apparatus of claim 11, wherein each of the smaller grains stored to a selected storage element is in turn distributed across at least some of the plurality of arrayed data storage devices of the selected storage element.

13. The apparatus of claim 10, further comprising a plurality of array controllers coupled to said storage elements.

14. The apparatus of claim 10, wherein each of the storage elements is provided with a corresponding storage element tag (SET) value, and wherein the larger grains are distributed in accordance with a cyclical wrapping grid function that incrementally cycles through different patterns of the SET values to distribute the small grains thereto.

15. The apparatus of claim 14, wherein the non-power of two number is odd, and a total number of the different patterns is equal to the non-power of two number.

16. The apparatus of claim 14, wherein the non-power of two number is even, and wherein a total number of the different patterns is equal to the non-power of two number divided by a power of two.

17. The apparatus of claim 10, further comprising a top level map (TLM) stored in a memory location with a wrapping grid offset value indicative of a selected storage element address.

18. The apparatus of claim 17, further comprising a bottom level map (BLM) stored in a memory location of each of the storage elements that identifies where each of the smaller grains are stored.

19. The apparatus of claim 10, wherein the storage elements operate in a basic mode in accordance with a standard SCSI (small computer system interface) model in which permission is granted by a unit master prior to execution of a command to transfer data between a host and said storage elements.

20. The apparatus of claim 10, wherein the storage elements operate in an enhanced mode in accordance with a split-SCSI (small computer system interface) model in which commands are coordinated by multiple hosts and forwarded directly to the storage elements without first securing permission from a unit master.

\* \* \* \* \*